June 6, 1933.    W. HARPER, JR    1,912,638
COMBUSTION ENGINE
Filed Jan. 20, 1930    12 Sheets-Sheet 1
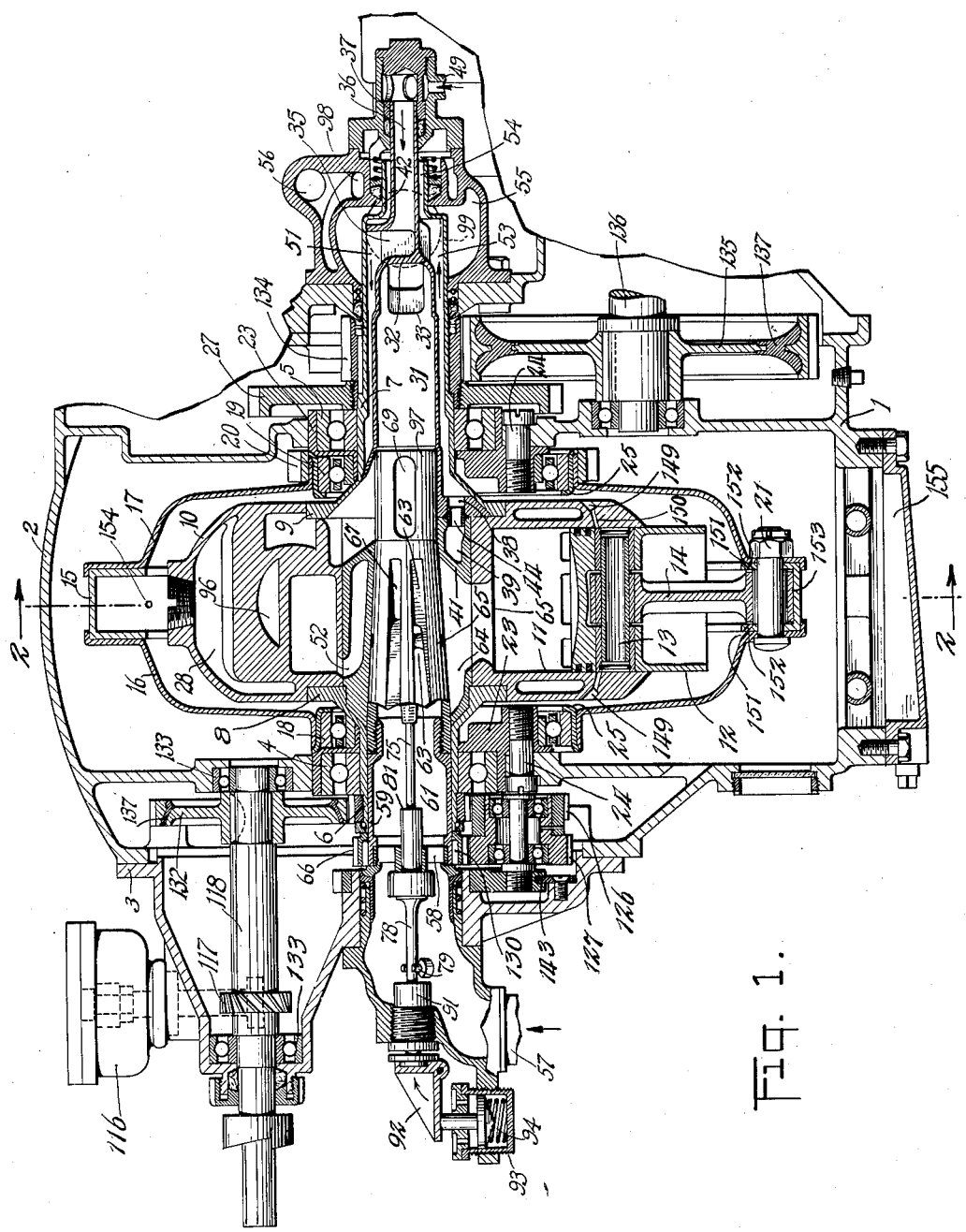
Fig. 1.
INVENTOR
WILLIAM HARPER, Jr.
BY
ATTORNEY June 6, 1933.  W. HARPER, JR  1,912,638
COMBUSTION ENGINE
Filed Jan. 20, 1930   12 Sheets-Sheet 2

INVENTOR
WILLIAM HARPER, Jr.
BY
ATTORNEY

INVENTOR
WILLIAM HARPER, Jr.
BY
ATTORNEY

June 6, 1933. W. HARPER, JR 1,912,638
COMBUSTION ENGINE
Filed Jan. 20, 1930 12 Sheets-Sheet 4
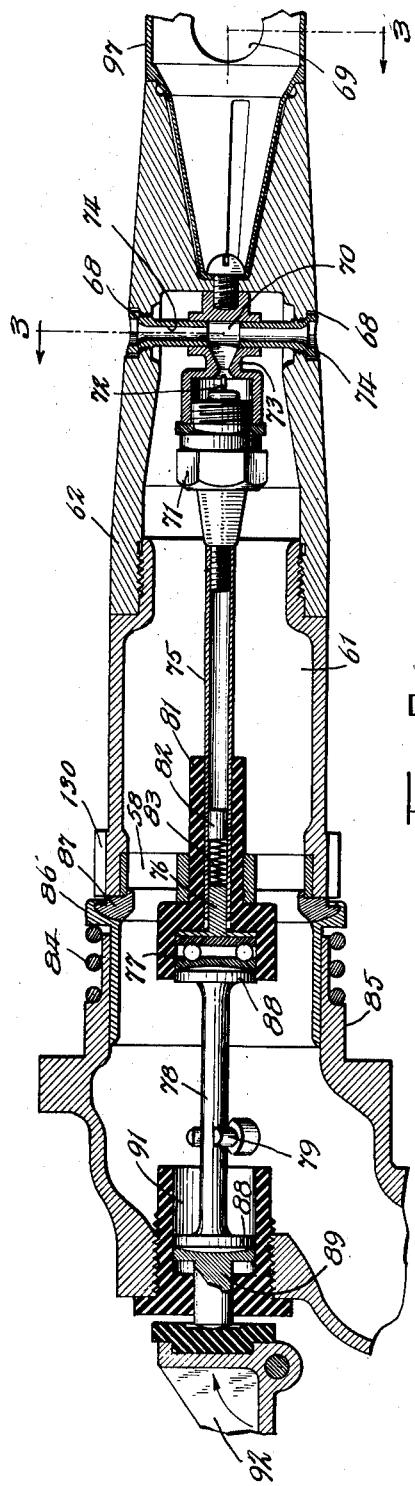
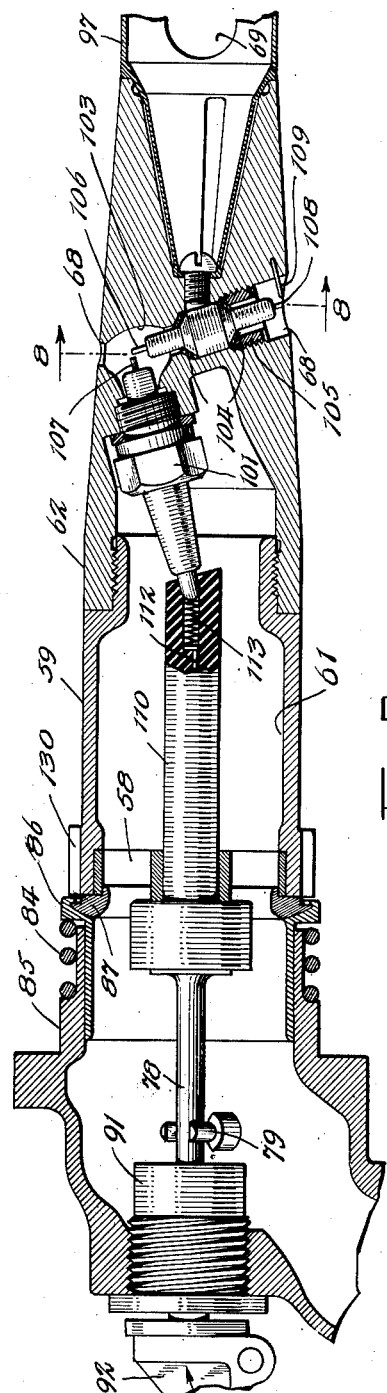
INVENTOR
WILLIAM HARPER, JR.
BY
ATTORNEY

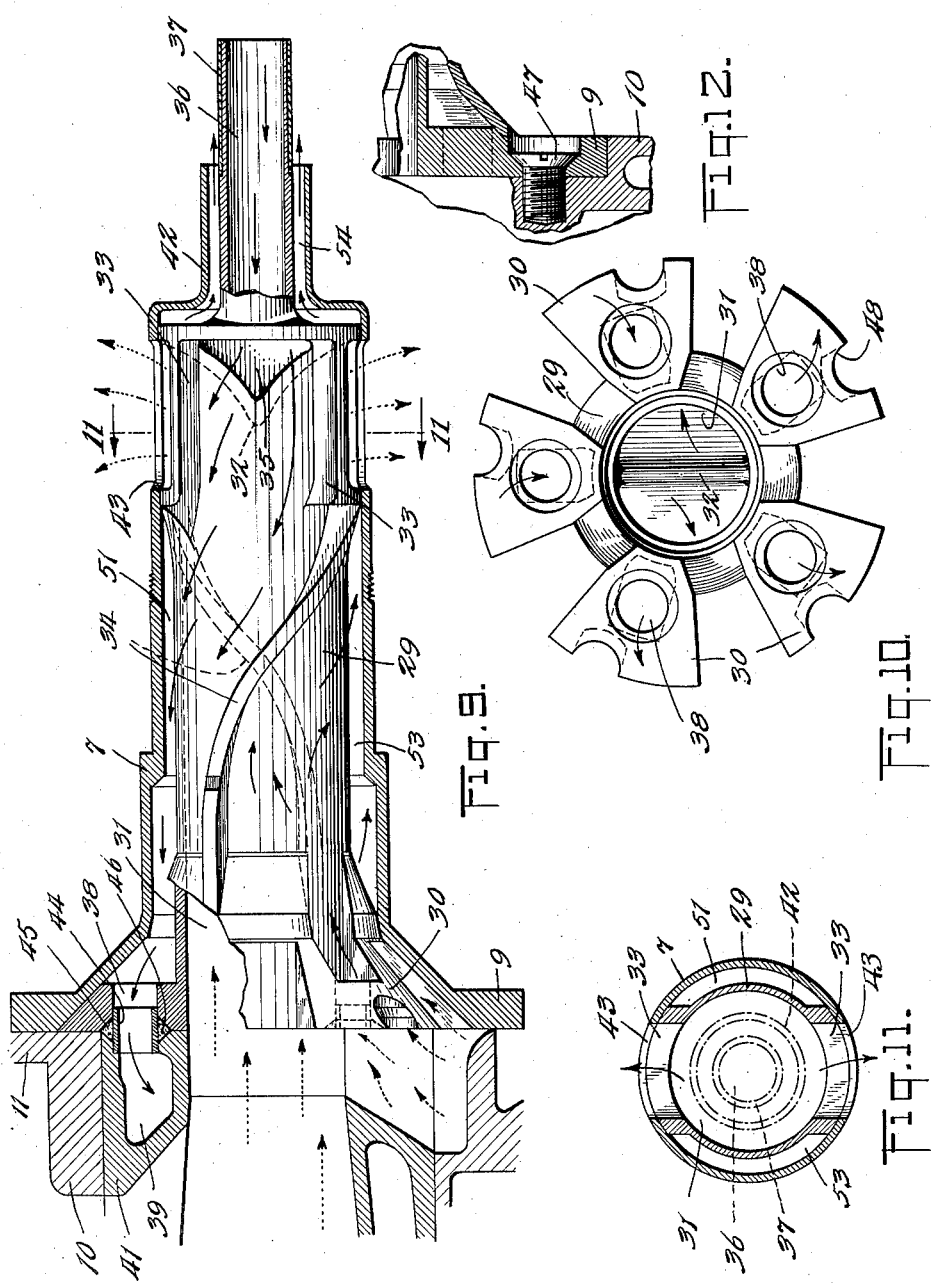

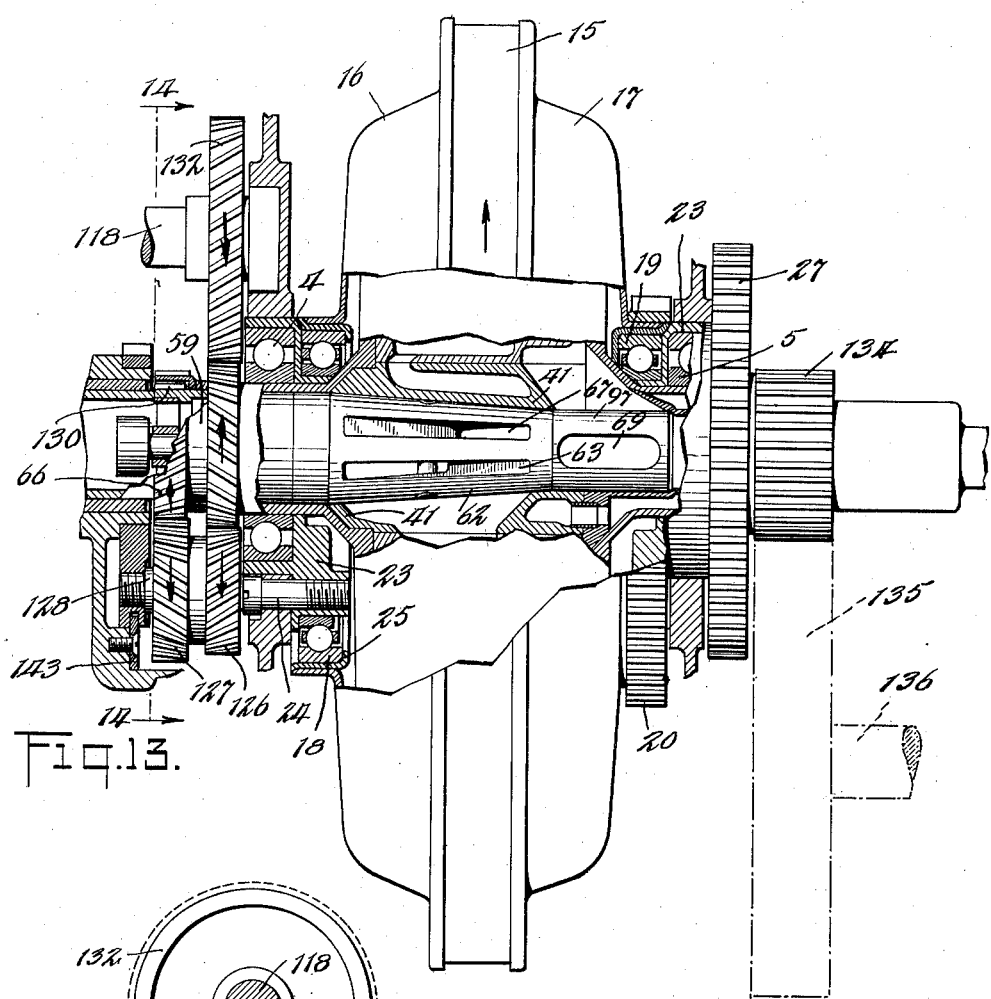
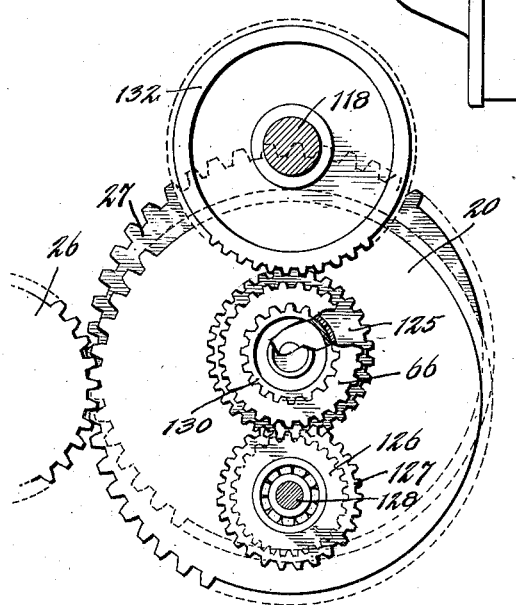

June 6, 1933.  W. HARPER, JR  1,912,638
COMBUSTION ENGINE
Filed Jan. 20, 1930    12 Sheets-Sheet 8

INVENTOR
WILLIAM HARPER, Jr.
BY
ATTORNEY

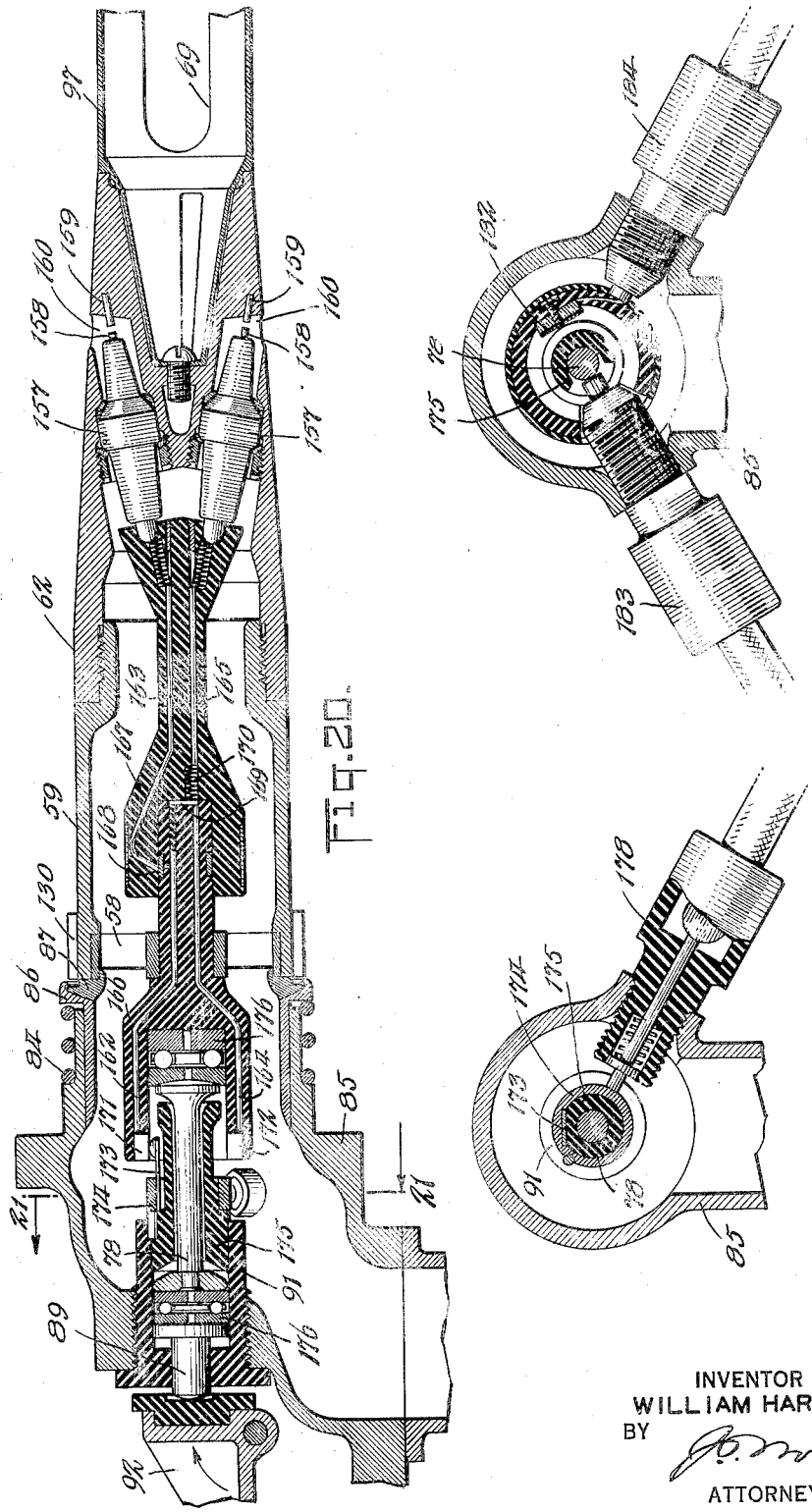

June 6, 1933. W. HARPER, JR 1,912,638
COMBUSTION ENGINE
Filed Jan. 20, 1930 12 Sheets-Sheet 10

INVENTOR
WILLIAM HARPER, JR.
BY
ATTORNEY

June 6, 1933. W. HARPER, JR 1,912,638
COMBUSTION ENGINE
Filed Jan. 20, 1930  12 Sheets-Sheet 11

INVENTOR
WILLIAM HARPER, Jr.
BY
ATTORNEY

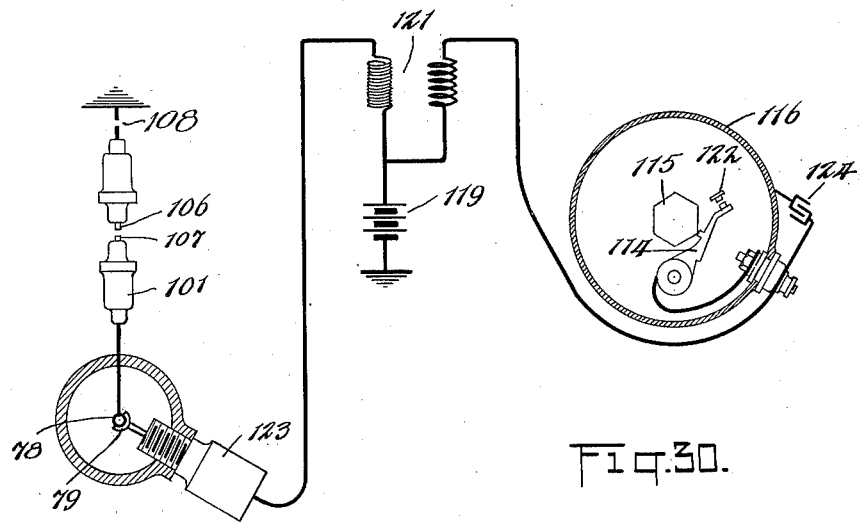
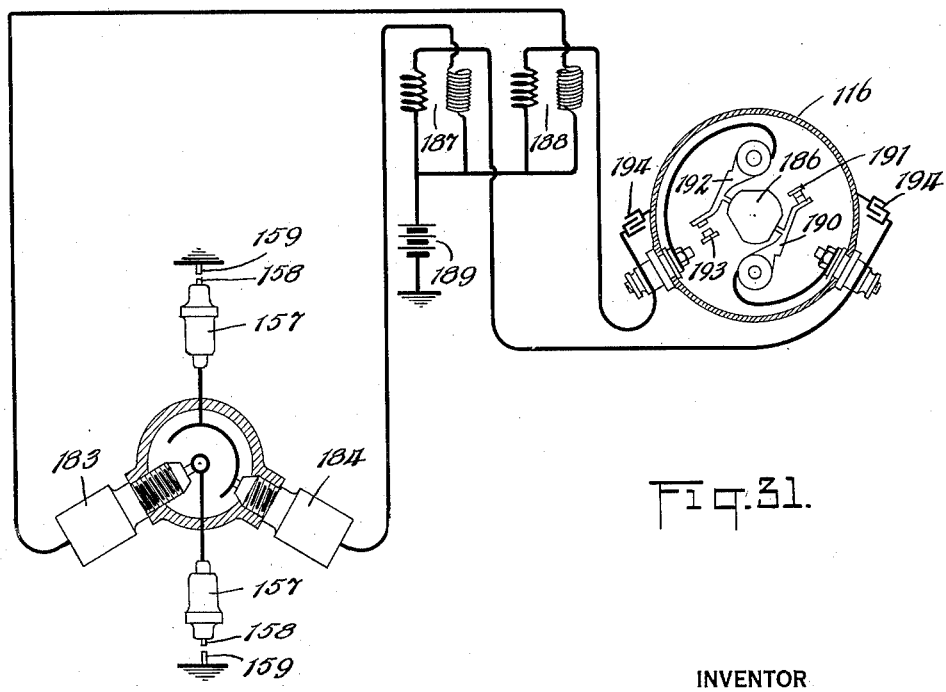
Fig.30.
Fig.31.

Patented June 6, 1933

1,912,638

UNITED STATES PATENT OFFICE

WILLIAM HARPER, JR., OF PORT WASHINGTON, NEW YORK, ASSIGNOR TO AMERICAN GAS TURBINE CORPORATION, OF NEW YORK, N. Y., A CORPORATION OF DELAWARE

COMBUSTION ENGINE

Application filed January 20, 1930. Serial No. 422,041.

This invention relates to improvements in rotary cylinder combustion engines, air compressors, etc., and has for its principal object to increase the efficiency of such engines.

Another object of the invention is to reduce friction losses due to pistons and wall thrusts by providing an improved piston carrying member which is geared to rotate with the cylinders so that a true balance is maintained, but which may be adjusted radially with respect to the cylinders to vary the side thrust.

Another object of the invention is to provide an improved rotary valve and driving means requiring only two inlet ports, two double exhaust ports and two cross-fire ignition ports, giving substantially twice the effective port area of previous valves of the same size, simplifying casting and machining of valve parts, reducing heat losses therein, reducing restriction of the flow of gases, and insuring uniform heating of the valve.

Another object of the invention is to provide an electrical ignition system independent of cross-fire ignition, utilizing special arrangements of one or more spark plugs within the valve timed to produce sparks simultaneously or alternately at the respective ignition ports, certain modifications being especially adapted for high speeds.

Still further objects of the invention are to provide an improved economical construction and assembly of the main shaft containing separate cooling inlet and outlet passages and exhaust ports; to provide improved means including a ball-bearing thrust mechanism for holding the valve on its seat against cylinder pressure and for cushioning longitudinal thrusts on the valve; to provide improved forced lubrication in which lubricating flow is effected by centrifugal force; to eliminate objectionable gear noises; and in general to reduce manufacturing and maintenance costs by various refinements and economies in construction which also make for lightness, compactness, and durability.

The engine comprises generally a frame or casing, resembling that of an electric motor, in which is journaled a hollow shaft to which is keyed the rotor casting with cylinder heads adjacent the shaft and having ports registering with ports in the shaft. The tapered rotary valve contained within the shaft is differentially driven and is provided with two inlet ports, two double exhaust ports and two ignition ports adapted to register with the shaft ports. The pistons relatively reciprocate in the cylinders, the outer ends of which are open, and are connected by links to an annular ring or reaction member which rotates in a plane offset from the plane of the rotor casting but is driven through special gears at the same rotating speed as the rotor casting. The engine may act on the four-cycle, two-cycle or Diesel principle, and preferably has an odd number of cylinders, a five cylinder engine being illustrated herein by way of example.

An important feature of the invention resides in the novel construction of a two-ported valve with similar ports directly opposite each other which, with proper differential timing of the valve, enables the smaller number of ports to control the five cylinders. In the five cylinder engine operating four cycle, as here illustrated, the valve is geared to turn one-quarter revolution faster than the cylinder rotor. This arrangement of two inlet ports opposite each other, two exhaust ports opposite each other, etc., not only simplifies casting and machining of valve parts, but gives substantially twice the port area of previous valves of the same size, insures that both sides of the valve will be heated uniformly, and, in the case of the ignition ports, is peculiarly adapted either for straight cross-fire ignition or for efficient spark-plug ignition.

In one form of valve, ignition is by direct intercepted passage of the flame from one cylinder through the ignition ports to a succeeding cylinder, in conjunction with a spark plug which functions not only in starting the engine but also in case ignition by cross-fire should fail for any reason. In this case the arrangement of opposite valve ignition ports results in shooting a straight flame from one cylinder to another by a path of minimum length, which reduces heat losses; and permits use of a direct straight line cross-fire ignition tube within the ports. Such arrangement allows a higher temperature of crossfire gas and a greater velocity, which develops more efficient turbulency in the combustion head of each cylinder. This arrangement of valve ports also enables the use of a central combustion chamber for continous combustion of Diesel fuel, utilizing the cross-fire jet as the charging means for each cylinder, as hereinafter more fully described. In the matter of electrical ignition, the two-ported valve enables the use of two spark plugs, or one spark plug with two gaps in series, to produce sparks alternately or simultaneously at both ignition ports. I shall give several examples of this type of ignition with special commutator systems adapted for standard and high speeds.

The engine is cooled by a combined centrifugal and forced water circulating system which comprises a novel construction of the main shaft in two parts which are assembled into an integral structure containing water inlet and outlet channels as well as an outlet for the exhaust, and in connection with which I provide improved water-tight connections to the rotor. In previous engines of this type the construction of a shaft containing water inlet and outlet passages has been a major item of expense because of the intricate nature of the casting and attendant loss in defective castings. My improved construction is especially important from an economic standpoint in that it materially reduces the overall cost of the engine.

The central thrust bearing mechanism includes an improved sealing connection or slip joint between the valve sleeve and the frame, which is actuated by a spring to hold the valve on its seat against cylinder pressure, but slides with the valve in response to automatic unseating means which prevents sticking. This mechanism also includes a central spring-pressed thrust rod and associated ball bearings for cushioning thrusts on the valve due to unbalanced cylinder pressure.

In constructing the engine numerous economies are effected in fabricating the various parts and in the use of materials. The piston carrying mechanism comprises pressed steel and rolled steel members which are so shaped that they can be easily manufactured, and will maintain their rigidity. The whole engine is assembled and held together with the smallest number of bolts and nuts, the same bolts and nuts in many cases being used for dual purposes.

The invention will be described in connection with the accompanying drawings, in which:

Fig. 1 is a longitudinal vertical section of the engine;

Fig. 6 is a longitudinal section through valve, sleeve and cushioning means shown in Fig. 1;

Fig. 7 is a longitudinal section through a modified form of valve having a single spark plug with two spark gaps in series for firing alternate cylinders;

Fig. 9 is a longitudinal section showing the water cooling system and exhaust through the main shaft of the engine;

Fig. 10 is an end view of the inner casting forming a part of the water cooling system;

Fig. 11 is a transverse section taken on the line 11—11 of Fig. 9;

Fig. 13 is a longitudinal vertical section of the engine with the housing omitted, showing the driving gears for the valve;

Fig. 14 is an end section taken on the line 14—14 of Fig. 13, showing the driving gears for the valve and for the piston carrying mechanisms;

Fig. 17 is an enlarged cross-section through a portion of the gear train for driving the valve;

Fig. 20 is a longitudinal section through a modified form of valve employing two spark plugs;

Fig. 21 is a section on the line 21—21 of Fig. 20, showing the single high tension lead to the dual segmented distributor of Fig. 20;

Fig. 23 is a section on the line 23—23 of Fig. 22, showing the separate high tension leads to the distributor;

Fig. 30 is a circuit diagram of the ignition system shown in Figs. 7, 20 and 21; and Fig. 31 is a circuit diagram of the ignition system shown in Figs. 22 and 23.

Figure 2:
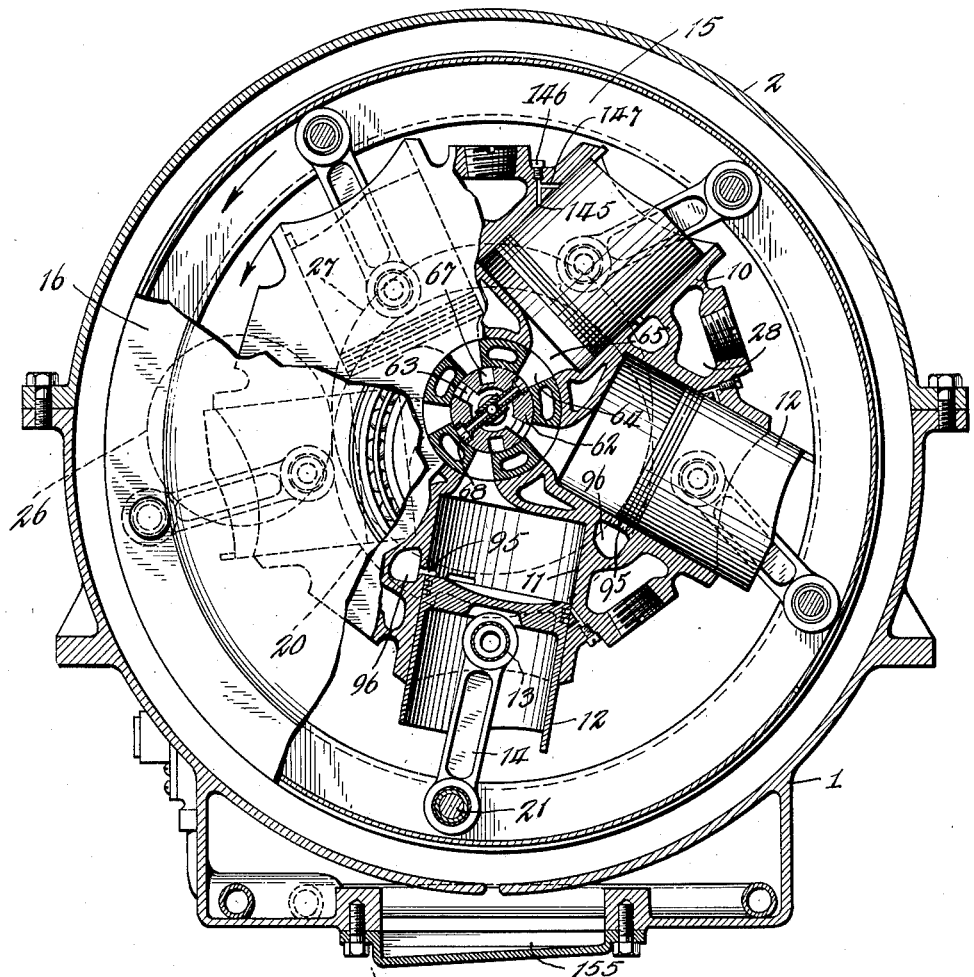
Fig. 2 is a transverse vertical section taken on the line 2—2 of Fig. 1.

The engine shown in Figs. 1 and 2 comprises a base casing 1 having a removable top 2 and removable end casing 3, provided therein with bearings 4 and 5 which support main shafts 6 and 7. The inner ends of shafts 6 and 7 are provided with flanges 8 and 9, respectively, which are fixed to and support the rotor casting 10. The cylinders 11 formed in the rotor casting are preferably tangential to a circle concentric to their center of rotation, though they may be radical. Hence the main shafts 6 and 7, their flanges 8 and 9, and the rotor casting 10 containing cylinders 11 turn as a unit, rotation being in the direction of the arrow in Fig. 2.

The pistons 12 are connected through wrist pins 13 and connecting links 14 to an outer U-shaped carrying ring or reaction member 15, so called because it takes the reaction of the pistons, which ring or reaction member has its axis offset from the axis of the rotor casting 10. The ring 15 is held in its true rotating plane by means of pressed steel cheek discs 16 and 17 supported on bearings 18 and 19, respectively, and driven by a spur gear 20. The cheek discs 16 and 17 enclose the rotor and are locked to the flanges of the ring 15 by means of bolts and nuts 21, to which bolts the piston links 14 are fulcrumed.

The mounting of the shaft bearings 4 and 5, and the cheek disc bearings 18 and 19, is best shown in Fig. 1 wherein the castings 23 which support these bearings are fixed to the base casing 1 by means of bolts 24. As shown in Fig. 1, the castings 23 have outer annular flanges spaced from the main shafts 6 and 7, respectively, and the shaft bearings 4 and 5 are fitted between these outer flanges and the respective main shafts. Likewise, the castings 23 have inner offset circular flanges or collars over which are slipped the bearings 18 and 19, respectively, held in place by suitable baskets 25.

Figure 18:
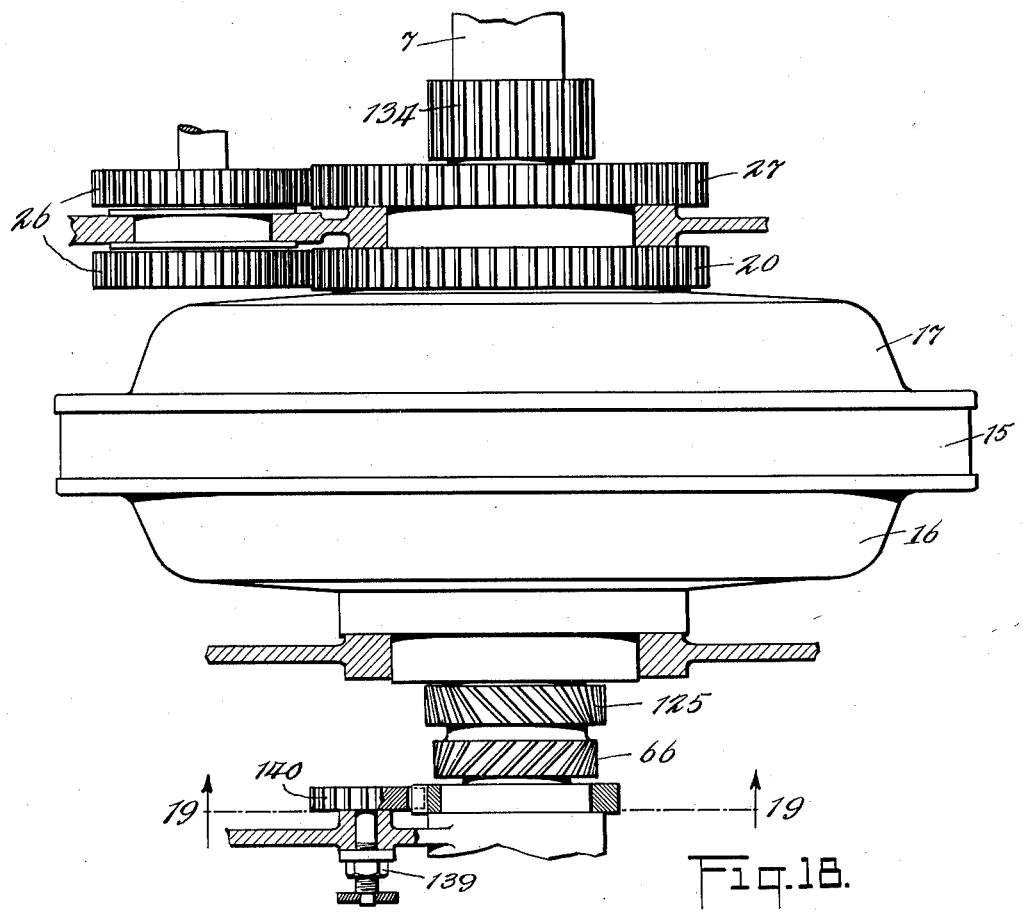
Fig. 18 is a plan view with the housing omitted, showing the driving gears for the rotor and the means for adjusting the timing of the valve.

The spur gear 20 meshes with counter-gears 26 which in turn mesh with gear 27 which is keyed to the main rotor shaft 7. The gears 20 and 27 thus rotate about separate and offset centers which develop but two points of mutual pitch diameter, as shown in Figs. 2 and 18, and at one of these points of common axis the gears 20 and 27 mesh with the counter-gears 26. The gears 20 and 27 may, however, be meshed to counter-gears such as 26 at either or both of the two points where the pitch diameters cross. The purpose of this gear mechanism is to drive the piston carrying system at the same rotating speed as the rotor 10, the functioning of the pistons in relation to the rotation of the rotor being such that a true balance is maintained. It will be seen that the angle of the links 14 may be altered and piston side thrust varied by a different meshing of the respective teeth of the gear train. This adjustment can also be used to vary the fixed compression ratio of the engine.

Water jacket space 28 is cored in the rotor casting 10 surrounding the cylinders, providing centrifugal water circulation. The novel construction of main shaft 7 in two parts, the assembly thereof into an integral structure containing water inlet and outlet channels and exhaust outlet, and the watertight connections to the rotor casting, are illustrated in Figs. 1 and 9 to 12, inclusive. The two parts consist of an inner core or light malleable casting 29, and the outer pressed steel shell 7 constituting the shaft proper. The casting 29 is cast in one piece with a flanged end comprising wings 30, an internal exhaust passage 31 which at the outlet end 32 divides into two diametrically opposite exhaust outlets 33, outer water partitioning spirals or fins 34, and a water opening 35 adapted to communicate with the water inlet passage 36 which is subsequently drilled in the integral stem 37 of the casting. Water conduit holes 38 in the wings 30 of the casting are drilled to meet the core impressions 39 in the valve bushing 41. The casting 29, having no blind cores, can be held uniform. The outer pressed steel shell 7, having the flange 9 at one end, is provided at its opposite end with a shaft extension 42 which receives the smaller stem 37 of the casting 29 when the parts are assembled. The shell 7 is also provided with outlets 43 which register with the exhaust outlets 33 in the casting 29. The shell 7 and casting 29 are assembled and dip-brazed together making a single unitary structure, as best shown in Fig. 9. In fitting the shaft to the rotor a water-tight seal is obtained by means of short brass ferrules 44 carrying rubber or other pliable rings 45 of rectangular cross-section which are seated in V-shaped slots 46 cut in the meeting edges of water conduit holes 38 and core impressions 39. The flanges 8 and 9 of the main shafts 6 and 7 are fastened to the rotor casting 10 by means of counter-sunk bolts 47 extending through meeting holes 48 in the flanges and rotor casting 10. When the parts are thus assembled the rubber packing rings 45 will be squeezed into the V-shaped slots 46 and fill them up thus effecting a water-tight seal, the ferrules 44 also keying the valve bushing 41 to the shaft 7, whereby the shafts 6 and 7, valve bushing 41 and rotor 10 turn as a unit.

The water enters through pipe 49, passing through the passage 36 and opening 35 in the casting 29 to the inlet channel 51 defined by the spirals 34 and comprising half the space between the casting 29 and the shell 7; thence by ingoing water conduit holes 38, core impressions 39 and passage 52 in the valve bushing, into the water jacket space 28 around the cylinders; thence returning to the exhaust side of the cooling system through outgoing water conduit holes 38, outlet channel 53 which is divided off from the inlet channel 51 by the spirals 34, through passage 54 formed between stem 37 and shaft extension 42, to water space 55 and thence by outlet pipe 56 and suitable pump to a radiator or other cooler, providing a combined centrifugal and forced cooling circulation. In the form illustrated, three of the water conduit holes 38 are inlets and the remaining two are outlets, although this may of course be modified. The construction described above gives an accurately water spaced channel system, and also maintains a close and uniform metal section structure, the whole being cheap to manufacture and eliminating the troublesome loss of encountering defective castings after considerable machine work has been expended. The spiral water passages make it possible to effect a drain of the water system by slowly rotating the engine, utilizing the principle of the Archimedian screw.

The charge inlet is by pipe 57 through a rotary mixing device 58 fixed to the valve sleeve 59. The fuel mixture then passes into the passage 61 within the valve sleeve 59 into the tapered valve 62, through the inlet ports 63, shaft ports 64 in the valve bushing 41, cylinder ports 65, into the cylinders. The shaft ports 64 are accurately machined and secured to register with the cylinder ports 65 as shown, for example, in Figs. 1 and 2.

The tapered valve 62 is driven by the valve driving gear 66 and associated gear mechanisms hereinafter to be described. The valve is rotated in the same direction with respect to the casing as is the valve bushing 41 and, in the five-cylinder engine operating four-cycle as here illustrated, is timed to rotate one-quarter revolution ahead of the valve bushing, whereby I have found it possible to use a valve with only two inlet ports 63, two exhaust ports 67, two internal regenerative supercharging ports 68 for the transfer of heat energy, and two auxiliary exhaust or shutter ports 69. These several ports are disposed directly opposite one another, that is, the inlet ports are opposite each other, as are the exhaust ports, etc., the inlet and exhaust ports being arranged together in pairs with the cross-fire ports midway between said pairs of ports, which insures that both sides of the valve will be heated uniformly. This construction also has the advantage of increasing the effective port area about 100% and provides a straight through passage for cross-fire ignition which is more efficient than a curved passage in that it permits a higher temperature and greater velocity of cross-fire gas which develops more efficient turbulency in the combustion head of each cylinder. This construction also simplifies the casting and machining of valve parts.

Figure 3:
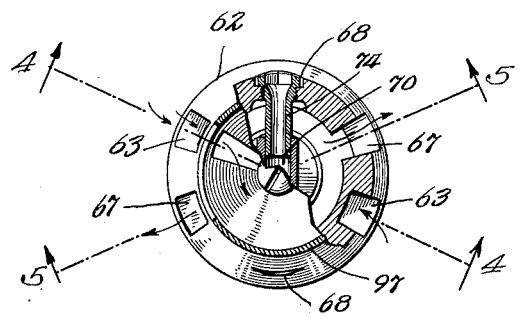
Fig. 3 is a cross-section of the valve taken on the line 3—3 of Fig. 6, showing the arrangement of valve ports.
Figure 4:
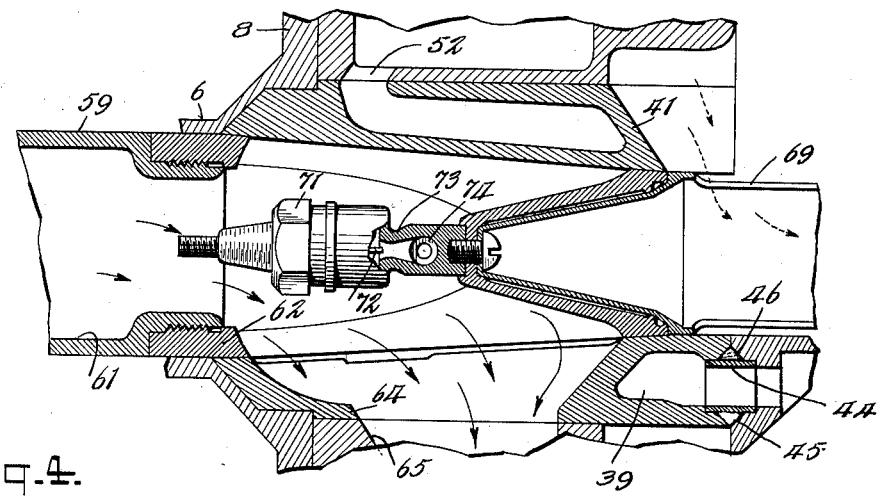
Fig. 4 is a longitudinal section taken on the line 4—4 of Fig. 3, but also including a portion of the rotor to illustrate the intake through the valve and cylinder ports.
Figure 5:
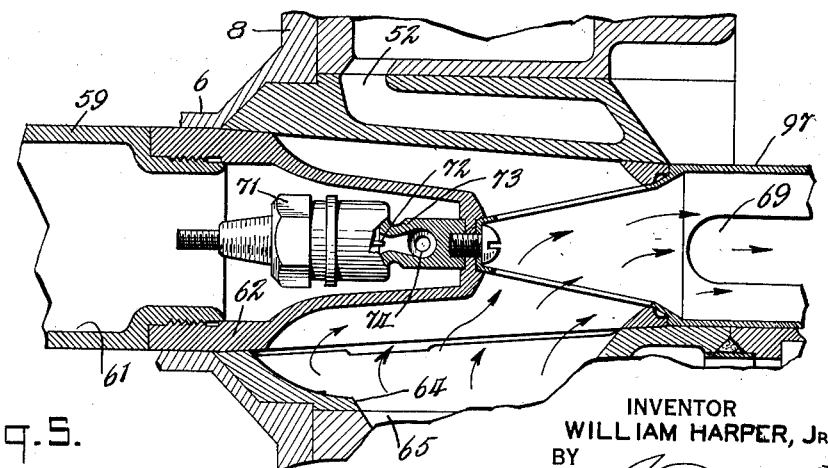
Fig. 5 is a corresponding section taken on the line 5—5 of Fig. 3, showing the exhaust through the cylinder and valve ports.

As shown in Fig. 6, the heat transfer or combustion chamber 70 formed between the ports 68 constitutes a heat reservoir, and is preferably provided with spark contacts for starting ignition. In Figs. 3 to 6, a single spark plug 71 is utilized in central point ignition and comprises contact 72 spaced a short distance from the contracted wall of metal socket 73 which constitutes the grounded contact. To provide proper design of the heat transfer ports, nipples or tubes 74 are screwed therein as shown in Figs. 3 and 6. The socket 73 into which the plug 71 is screwed is so proportioned and separated from the body of the combustion chamber as to allow a minimum of cross-sectional areas of metal contact as shown in Figs. 4, 5 and 6, so that the heat from the combustion chamber is restricted from radiating into the spark plug and interfering with its electrical qualities. The supply current for the spark is carried by the tubular electrode 75, flanged plunger 76, ball bearing 77 and thrust rod 78 in contact with forked terminal 79, as shown in Fig. 6. The tube 75 is supported in insulating bushing 81 carried by the rotary mixing device 58, and preferably terminates short of the flanged end of plunger 76 to provide clearance. A plug 82 is secured in the tube 75, by press-fitting or otherwise, and spring 83 between plug 82 and plunger 76 serves as a cushion between the tube and plunger. The conical valve 62 is held seated by a spring 84, but cushioning of thrusts on the valve due to unbalanced cylinder pressure is taken up largely by the thrust rod 78 and associated mechanisms. The spring 84 is compressed between the carburetor elbow 85 and a slip-joint 86 fitting into the carburetor elbow. The slip-joint 86 pushes against an intermediate flared bronze washer 87 which makes a flat contact against the end of valve sleeve 59 and a convexed knuckle contact against the slip-joint 86. The central thrust rod 78 has a convex head 88 at one end contacting with the outer concave face of ball bearing 77, and a similar convex head at the opposite end contacting with the concave flanged face of plunger 89 acting in the cylindrical chamber of bushing 91 which is formed of insulating material and threaded into the carburetor elbow in axial alignment with the ball bearing 77. The outer stem of plunger 89 contacts with a pivoted plate 92 the opposite face of which contacts with the piston rod of a spring-centered dashpot 93 having a spring 94 which centers the piston and normally exerts an upward thrust on plate 92 as indicated by the arrows in Figs. 1 and 6. Timing of the spark plug 71 is controlled in any suitable manner, as by means of the timing system shown in Fig. 30 hereinafter to be described.

The exhaust of the engine occurs in three stages, first the ignition exhaust for internal supercharging or transfer of heat from the working cylinder through the ports 68 and chamber 70 to the second succeeding or compressing cylinder; secondly, the main high temperature exhaust which is through the ports 95 shown in the cylinder walls in Fig. 2, into the passages 96, thence through shutter ports 69 in the tubular extension 97 carried by the valve 62; and lastly, the residual exhaust through cylinder head ports 65, shaft ports 64, and exhaust ports 67 in the valve 62. The residual exhaust through the cylinder heads and the main exhaust through the ports 95 both pass out through the exhaust passage 31 in the shaft 7, exhaust outlets 43, and thence through passages 98 to pipe 99 leading from the engine. Thereby the main exhaust has an ejector effect through exhaust ports 67, creating a strong vacuum to more effectively scavange the residual gas. The exhaust passages 96 are shown in Figs. 1 and 2 as being curved in direction so as to permit of water jacketing between them. The valve extension 97 controlling the main exhaust is desirable to prevent back-firing in a four-cycle engine because the ports 95 are opened and closed by the pistons once in each revolution. This valve extension prevents exhaust gas being drawn into a cylinder just before the completion of the suction stroke. As in the main valve, the valve extension 97 requires only two shutter ports 69 due to the rotation of the valve one-quarter speed ahead of the rotor in the five-cylinder engine here illustrated. The shutter ports 69 are disposed directly opposite each other, are each about equal in width to the space occupied by a pair of valve inlet and exhaust ports 63 and 67, and are in longitudinal alignment with such paired valve ports. The tubular valve 97 need not be as tight and close a fit as the main valve 62. Scavenging of the cylinders of low temperature exhaust gas is accomplished by the inward stroke of the pistons through the cylinder ports 65, shaft ports 64, and exhaust ports 67 in the valve 62.

The timing of the valve or, in other words, the angular relationship between the valve ports and the shaft ports, is controlled by manual means hereinafter described. It is possible to transfer a portion of the incandescent charge from a working cylinder to a succeeding cylinder before the second cylinder is at the completion of its compression stroke and it is possible to have this transfer occur as much as 80 circular degrees in advance of the innermost point of the piston travel. The reasons why this heat energy transfer and ignition may occur as early in the compression stroke without producing any knock in the cylinder is due to several things. The cylinders being preferably tangent to a circle whose radius is equal to one-half the piston stroke, and due to the fact that the pistons are moving slowly, there is no substantial leverage to cause any appreciable knock. A further reason is to be found in the thorough agitation of the compressed gases by the incoming stream of heated gases, and this occurs when the volume between cylinder head and piston is not a minimum but decreasing. In the working cylinder the heat transfer occurs anywhere from roughly one-third to a half and often two-thirds of the power stroke, though it may occur earlier or later in the power stroke.

Figure 8:
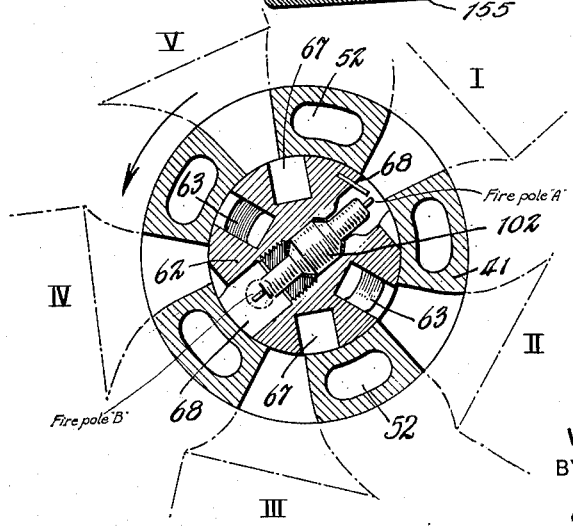
Fig. 8 is a transverse section taken on the line 8—8 of Fig. 7, but with the respective ports in the same position as in Fig. 2.

Figs. 7 and 8 illustrate an electrical ignition system employing a single spark plug 101 with two spark gaps in series, timed to produce sparks simultaneously at both gaps but utilizing alternate gaps for ignition purposes. In Figs. 7 and 8 the auxiliary plug 102 is inserted through the large end of chamber 103 connecting the ignition ports 68, being seated against copper rings 104 and held in place by a threaded bushing 105, and comprises contact 106 spaced a short distance from contact 107 of primary spark plug 101, and contact 108 spaced a short distance from the grounded contact 109. The insulating sleeve 110 is longer than sleeve 81 of Fig. 6, and contains electrode 112 which carries the current for the spark and is electrically connected to spark plug 101 through spring 113. Timing of this spark plug is controlled in any suitable manner, but preferably by the commutator shown in Fig. 30 which is specially adapted to produce sparks simultaneously at both gaps through a single high tension lead to the primary spark plug 101.

The commutator shown in Fig. 30 comprises a breaker 114 and six-pointed cam 115 mounted in casing 116, the cam 115 being driven by gear 117 on crank-shaft 118, as shown in Fig. 1. The energizing circuit extends from grounded battery 119 through the primary winding of induction coil 121, breaker 114, contact 122 to ground. The alternate making and breaking of contact 122 causes corresponding impulses to be induced in the secondary winding of induction coil 121 which is connected by plug 123 to the primary spark plug 101, producing simultaneous sparks at both gaps. The condenser 124 shunted across the breaker arm 114 protects contact 122 against arcing. As the ports 68 in the valve register with the ports 64 in the valve bushing 41 alternate spark gaps are utilized for ignition purposes; that is, only one of the two series of spark gaps is utilized for igniting a charge of gas while the other or ineffective spark gap is still exposed to an exploded charge of gas remaining from one of the opposite ports of the rotor.

Figure 15:
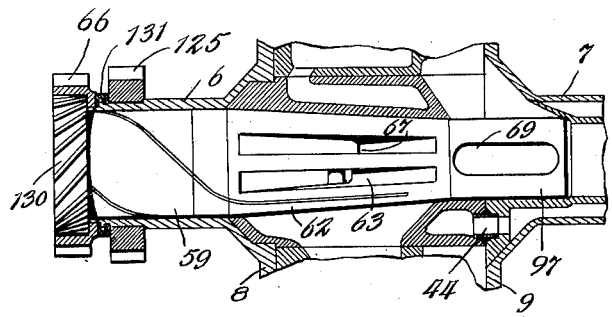
Fig. 15 is a longitudinal section showing the valve and its driving gear in one position.
Figure 16:
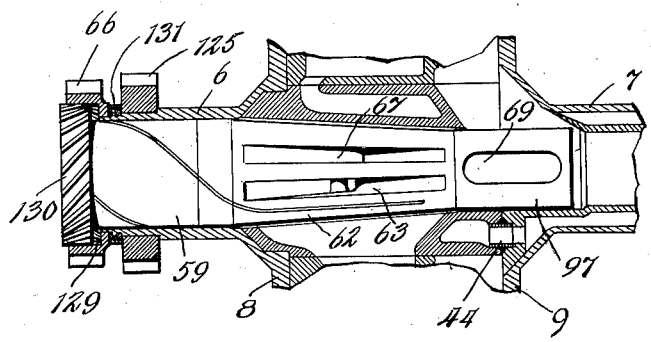
Fig. 16 is a view corresponding to Fig. 15, but with the valve and its driving gear in another positon after unseating.
Figure 12:
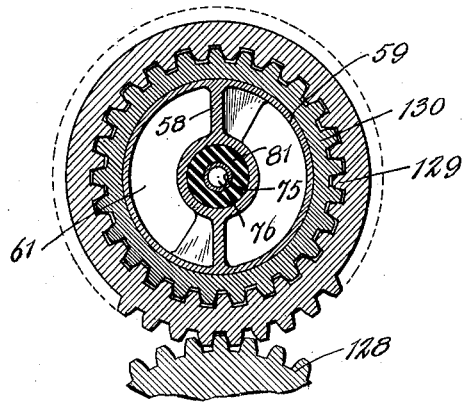
Fig. 12 is a fragmentary section showing the manner of securing the rotor casting to the main shaft.

The gears for driving the valve 62 one-quarter speed ahead of the cylinder rotor, and the associated gears for automatically unseating the valve to prevent sticking, are best shown in Figs. 13 to 17, inclusive. Driving of the valve is accomplished from the gear 125 which is keyed to the shaft 6, through connected idler gears 126 and 127 on shaft 128, to the outside valve gear 66 which is loose or rotatable on the valve sleeve 59. The gear 66 has external twisted teeth and a set of internal spline-like projections 129. The valve sleeve 59 is provided on its periphery with a member 130 which is made up of spline-like projections which cooperate with the internal spline-like projections 129 of gear 66 to drive the valve. For automatically unseating the valve 62 with increase in its driving torque the spline-like projections 130 are twisted in such fashion that they have a slight sliding motion on the projections 129. From this it results that the longitudinal components of thrust are unbalanced and there will be a tendency to thrust the valve toward the left as viewed in Fig. 13 upon any increase in driving torque due to valve sticking, etc. In order to partially balance lateral thrusts in some of the transmission gears they are made with twisted teeth oppositely arranged. Although the valve gear 66 is loose or rotatable on the valve sleeve 59, it normally acts as a coupling to rotate the valve due to the fact that its inside projections 129 mesh with the spline-like projections of member 130 which is keyed to the valve sleeve 59. When the valve 62 binds in its seat, however, the gear 66 acts as a cam and automatically unseats the valve. In Fig. 15 the valve 62, gear 66 and member 130 are shown in their relative positions for normal rotation, the gear 66 contacting with a shoulder 131 on shaft 6. When the valve 62 tends to bind by moving to the right in Fig. 15, it of course tends to carry the member 130 to the right, but inasmuch as movement of gear 66 to the right is limited by shoulder 131 of the shaft 6 it will be seen that the inside twisted projections 129 of gear 66 will cam the member 130 and valve 62 to the left as shown in Fig. 16. This action, of course, is opposed by the spring 84 and associated central thrust bearing mechanism, tending to hold the valve properly seated.

It will be seen that the shaft gear 125 meshes with hand-crank gear 132 which is keyed to crank shaft 118 supported in bearings 133, for starting the engine by hand. Power is conveyed from the main shaft 7 through its gear 134 to the gear 135 on shaft 136. In order to reduce gear noises I provide means for breaking the metallic continuation of the material about the gear teeth with the web and hub of the larger diameter gears. This is accomplished in gears 132 and 135, for example, by molding a lead spacer 137 between the rim and web of the gear as shown in Fig. 1. Any other metal of sufficient rigidity may be used for this purpose provided its amplitude of vibration is different from that of the mass of the gear.

In the construction illustrated, the relation between gears 125, 126, 127 and 66 is such that the valve 62 is rotated one-quarter speed ahead of the valve bushing 41 or, in other words, one-quarter revolution ahead of the cylinder rotor since valve bushing 41 is keyed to rotate as a unit with the main shaft and rotor. In the preferred construction, the shaft gear 125 has twenty-five teeth, the idler 126 twenty teeth, and idler 127 and gear 66 twenty-four teeth each. Hence one complete revolution of shaft gear 125 having twenty-five teeth, causes one and one-quarter revolutions of idler gear 126 having twenty teeth, and consequently one and one-quarter revolutions of gears 127, 66 and member 130, driving the valve 62 one-quarter speed ahead of the valve bushing 41 and the rotor.

To adjust the timing of the valve a lock nut 139 is released to enable rotation of gear 140 engaging teeth 141 on a member having a projection 142 carrying the shaft 128 on which are mounted the idler gears 126 and 127. Shifting the position of the shaft 128, and consequently the point of engagement of idler gears 126 and 127 with gears 125 and 66, will shift the angular relationship between the valve ports and the shaft ports, or adjust the timing of the valve. This adjustment may be made during rotation of the valve. The guide frame 143 fitting in a slot in the projection 142 holds said projection in line.

The order of firing of the cylinders is the same in Figs. 2 and 8, although in Fig. 2 ignition is by direction transfer of heat energy from a working cylinder to a succeeding cylinder, while in Fig. 8 ignition is effected electrically at alternate spark gaps. In both of these views the parts are in the same relative positions, and rotation is in a counter-clockwise direction as indicated by the arrows, it being understood that the valve 62 rotates one-quarter speed ahead of the valve bushing 41 which is keyed to rotate with the rotor. The cylinders are numbered I to V, respectively, reading in a clockwise direction in Figs. 2 and 8. Accordingly, during each complete revolution of the rotor (one and one-quarter revolutions of the valve) the cylinders will be fired in the order of I, III, V, II, IV, by alternate fire poles A and B, respectively, that is, starting with the ignition of cylinder I by fire pole A, cylinder III will next be fired by fire pole B, cylinder V by fire pole A, etc. During the second complete revolution the cylinders will be fired in the same order but by the opposite fire poles; that is, cylinder I by fire pole B, cylinder III by fire pole A, etc. This complete cycle of operations therefore requires two complete revolutions of the rotor, being two and one-half revolutions of the valve.

Lubrication of the engine is maintained by the conventional pressure feed from a positively driven oil pump, not shown. The rotary motion given the charge fed in through the inner space 61 of the valve sleeve 59 by the mixing device 58 causes any liquid oil particles to be separated out and to fall into the bottom of space 61. From there oil grooves lead the oil thus separated into helical grooves on the outside of the valve sleeve, as shown in Figs. 15 and 16. These grooves are arranged to force the oil to the right toward the tapered portion of valve 62, where substantially straight longitudinal grooves keep the valve lubricated.

To remove excess oil from the cylinders into the casing, and to lubricate the pistons, liquid oil particles are centrifugally separated and pass into the oil passage 145 shown in Fig. 2 when this passage is uncovered by the piston. A plug 146 closes the end of passage 145 while communicating passage 147 leads into the casing from the leading side of the cylinder where centrifugal force is a maximum, whereby any oil or oil spray collected by the piston head is centrifugally discharged into the casing. In order that the exhaust may be as dry as possible the exhaust ports 95 lead from the lagging side of the tangentially arranged cylinders. The passages 145 and 147 leading into the cylinder are spaced far enough apart so that both of said passages are not uncovered by the piston at the same time; as the piston moves outwardly oil collects in passage 145, and as the piston moves inwardly uncovering the mouth of passage 147 the oil then discharges from 145 and 147, spurts out into the casing under the influence of centrifugal force and provides the necessary piston lubrication.

Figure 24:
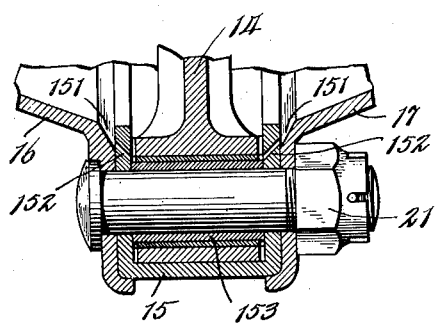
Fig. 24 is an enlarged section through the outer edge of the cheek discs and piston-carrying ring, showing the method of lubricating the link pin bearings of the pistons.

Lubrication of the wrist pins 13 is effected by allowing the centrifugal flow of oil which originally comes from the center of the motor to be trapped in pockets 149 at the sides of the rotor casting, the oil thereupon flowing through ducts 150 to the piston surfaces and piston wrist pin bearings. The oil collecting on the cheek discs 16 and 17 is drained into gutters 151 at the juncture of these discs and the main carrying ring 15. Oil ducts 152 are drilled here, as best shown in Fig. 24, to lead the oil to a link pin bearing which comprises a hard steel bushing 153 which acts as a spacer and is centered and held in place by bolt and nut 21 which also locks the piston carrying elements together. The overflow of oil finally accumulates at the interior periphery of ring 15 from which it is thrown off through small holes 154 and returned to the sump 155 of the casing, from which point it is again drawn to the oil pump.

Fig. 20 shows a modified form of valve having a pair of spark plugs 157 on opposite sides of the valve axis, having the usual contacts 158 spaced a short distance from the respective grounded contacts 159 at the diametrically opposed ignition ports 160, the intake and exhaust ports in this valve being arranged as in the valves previously described. The separate high tension leads to the respective spark plugs are each made in two parts, 162, 163 and 164, 165, respectively, contained within insulating sleeves 166, 167 which have a telescopic and rotative connection to facilitate assembly of the valve 62 on its sleeve 59. The lead 162 terminates in a ring 168 in contact with the end of lead 163, while lead 164 terminates in a plate 169 which contacts through spring 170 with the lead 165. At their other ends the leads 162 and 164 are connected to diametrically opposed distributor segments 171 and 172, respectively, adapted for alternate engagement with contact brush 173 which is secured to a stationary contact ring 174 carried by insulating sleeve 175 in the bushing 91, producing sparks alternately at the respective spark gaps. In this form of the invention the central thrust bearing mechanism includes a pair of ball bearings 176 properly insulated by bushing 91 and sleeve 166, respectively, with the thrust rod 78 between them. This ignition system is functioned by the commutator shown in Fig. 30, connection to the contact ring 174 being by means of connecting plug 178 as shown in Fig. 21.

Figure 22:
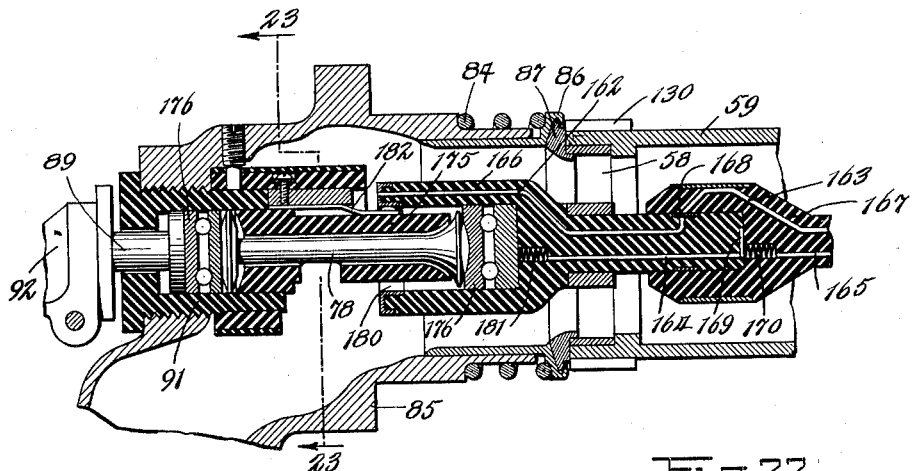
Fig. 22 is a view corresponding to Fig. 20, but illustrating a different connection to the spark plugs, adapted for very high speeds.

Figs. 22 and 23 illustrate a modified arrangement for introducing high tension leads to a system employing two spark plugs as in Fig. 20, but with the difference that it eliminates the segmented distributor 171, 172 which in some cases may cause trouble due to arcing. In Fig. 22 the leads 162 and 164 terminate at points 180 and 181, respectively, 180 comprising a circular bronze ring in constant contact with the running distributor brush 182 which is insulated from the central thrust bearing mechanism, and 181 preferably being a spring in contact with the adjacent ball bearing 176 of the central thrust bearing mechanism. Two separate outside high tension leads are connected to the respective conductors by plugs 183 and 184, as shown in Fig. 23, plug 183 being connected to central thrust rod 78, and plug 184 being connected to distributor brush 182.

The ignition system of Fig. 22 is functioned by the special commutator shown in Fig. 31 comprising a two-breaker commutator with a three-pointed cam 186 running at the same speed as in Fig. 30, and with separate induction coils 187 and 188. The respective parallel energizing circuits extend from grounded battery 189, through primary winding of induction coil 187, breaker 190, contact 191 to ground; and from grounded battery 189, through primary winding of induction coil 188, breaker 192, contact 193 to ground. The cam 186 in rotating opens and closes contacts 191 and 193 alternately, causing corresponding impulses to be induced in the secondary windings of induction coils 187 and 188 which are connected to connecting plugs 184 and 183, respectively, producing alternate sparks at the two spark gaps. The breaker arms 190 and 192 are shunted by separate condensers 194 to prevent arcing. An important advantage of this dual connection and arrangement of coils for the two separate spark plugs in the valve is that the electrical duty is divided up between the two separate coils so that the engine may be operated at very high speeds without encountering the electrical limit of coil saturation frequency. It will be evident that this feature may be used to advantage in other different types of motors.

Figure 25:
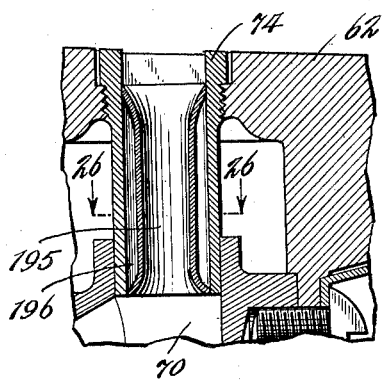
Fig. 25 is a transverse section through a valve of the type shown in Fig. 6, but with a liner of refractory material in the ignition path to maintain the cross-fire gases at high temperatures.
Figures 26, 27:
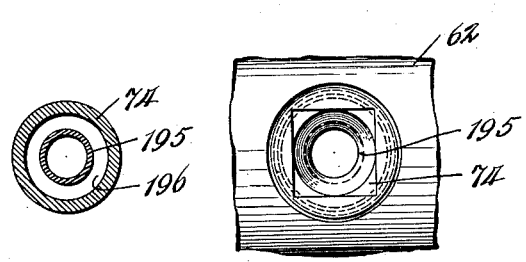
Fig. 26 is a cross-section taken on the line 26—26 of Fig. 25.
Fig. 27 is a fragmentary plan view of the valve of Fig. 25.

Figs. 25 to 27 illustrate a modification of the preferred form of valve shown in Fig. 6 and is adapted to maintain the cross-fire gas at high temperatures, using either gasoline or heavy fuel oil. In this form I employ a spool-shaped liner 195 of refractory material or metal such as platinum which I insert in the ignition tubes 74 for the purpose of heat insulation and to eliminate radiation of heat of the gas to the valve body. The liner 195 is flared at the ends so that only such flared ends contact with the tube 74, being secured thereto by welding or otherwise, and permits of an annular dead gas space 196 around its outer periphery. The orifice of the tube 74 at the valve surface is rectangular, as shown in Figs. 25 and 27, to permit the tube to be unscrewed and withdrawn from the valve.

Figure 28:
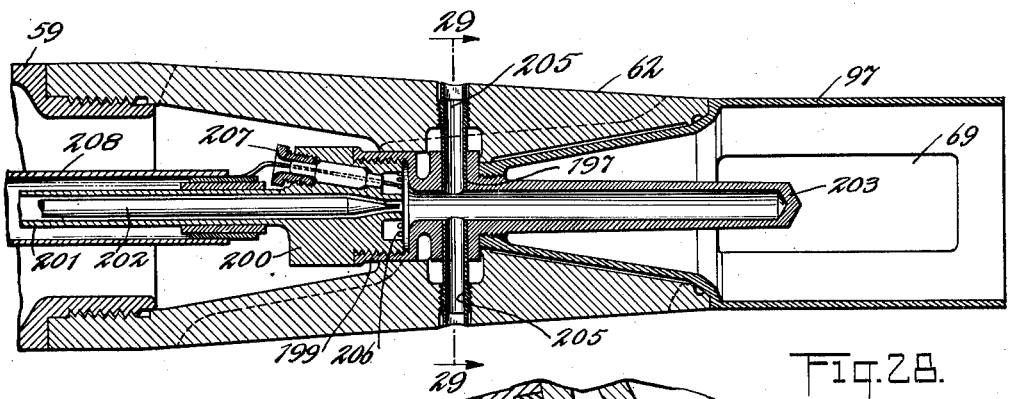
Fig. 28 is a longitudinal section through a two-ported valve of the type shown in Fig. 6, but with a special combustion chamber adapted for oil injection or Dieselizing of the engine.
Figure 29:
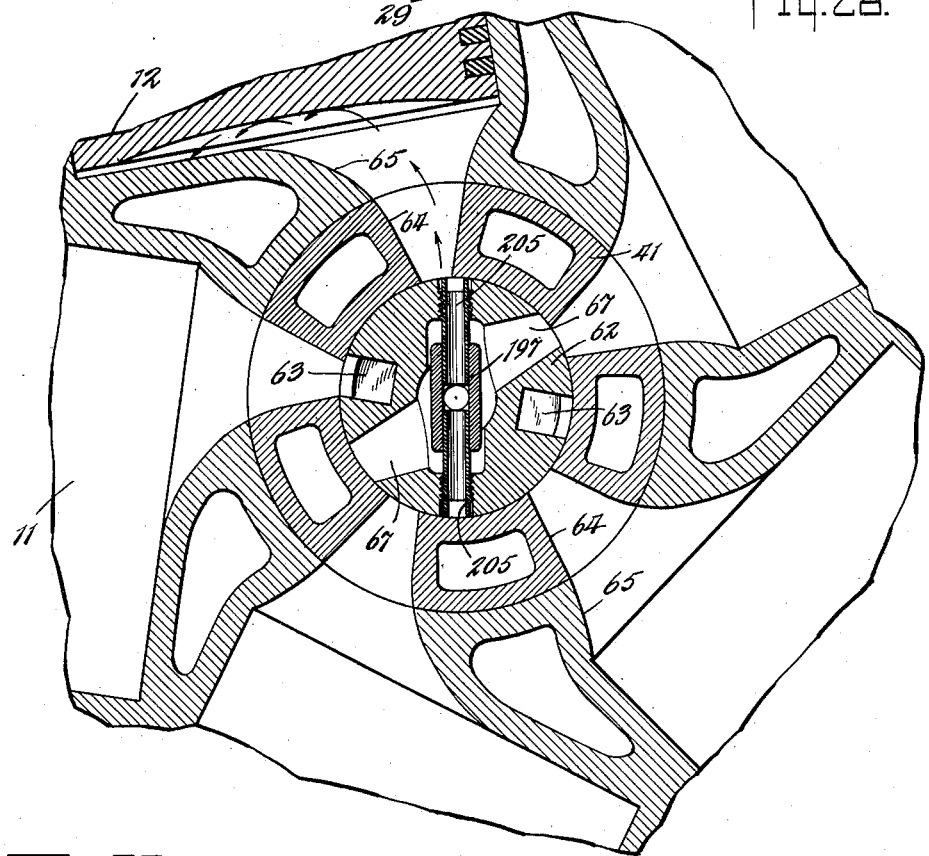
Fig. 29 is a cross-section on the line 29—29 of Fig. 28 but with the addition of the valve bushing and a portion of the cylinders.

Figs. 28 and 29 illustrate a modified form of two-ported valve adapted for oil injection or Dieselizing the engine. The port edge of this valve is substantially the same as in the carburetor or gasoline type previously described, but a change is made in the combustion chamber 197 which is held at the central axis of the valve as by threading at 198 to the valve extension 97. The end of chamber 197 toward the large end of the valve is threaded at 199 to receive the oil nozzle 200 having inlet tube 201 and needle valve 202 which almost closes the entrance to the combustion chamber. The other end of chamber 197, toward the small end of the valve body, comprises an extension in the shape of a sealed tube 203. The two cross-fire tubes 205 communicate with the surface of the valve, and are so spaced between the inlet ports 63 and exhaust ports 67 that their centers are about one-third of the peripheral distance between the two ports and nearer the exhaust port, as shown in Fig. 29, although this position can be changed. A heating coil 206 at the juncture of combustion chamber 197 and oil nozzle 200 is utilized for starting ignition, being connected by plug 207 to tubular electrode 208 carrying a low tension supply current.

Figure 19:
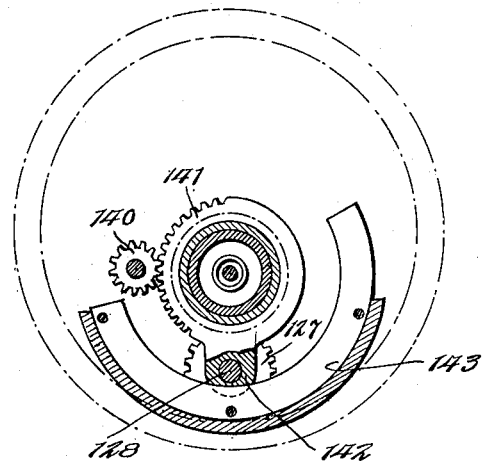
Fig. 19 is section on the line 19—19 of Fig. 18.

Oil is maintained at a high constant pressure at the nozzle 200, having been metered externally by suitable means in proportion to the speed or power of the engine. This atomized oil is ejected into the inner combustion chamber 197 and partially fills the central sealed tube 203. After the first explosions have occurred, the varying pressures in the cylinders will pulsate a column of partially burned gases alternately in and out of the ignition tubes 205, this same pulsation being carried longitudinally into the central expansion tube 203 which is maintained at a very high temperature. As in the case of the carburetor or gasoline type of valve shown in Fig. 6, the functioning of the cross-firing tubes in igniting and supercharging the engine will act as a charging pump introducing very high temperature oil vapor into the compressed air of each cylinder chamber as it is ready to proceed on the expansion stroke, depending upon the relative setting of the valve which is controlled by the valve timing adjustment illustrated in Figs. 18 and 19. This structure further provides that as the primary injection of superheated oil vapor is ejected from the center of the valve into a compressed charge of air, that it will here further expand due to chemical reaction, thereby developing momentarily a greater external pressure than in tube 203. This will have the effect of backing up the fuel charge into tube 203 until further expansion has occurred in the cylinder after which a secondary exit of combustible vapor will be again introduced into the same cylinder, again raising its pressure, thereby using tube 203 as a pressure controlling device so that excessive cylinder pressures and strains are avoided. Further, due to this construction, it is the case that the final pressure in tube 203 and the cross-fire tubes 205 will be equal to the cylinder pressure just before the communication of tube 205 is cut off from such cylinder, this point being so arranged that, at the cut-off point, the heat pressure in the cylinder is greater than the compressed air pressure in the next alternate cylinder that is approaching dead center conditions ready for the expansion stroke. In the meanwhile, the continuous fuel injections having taken place, the residue of heated gases in tubes 203 and 205 having some air in them, primary combustion is continuous in the combustion tubes 205 and 203, and when the cylinder port opens to the opposite tube 205 a superheated charge of pre-ignited gas is ejected from the displacement of tube 205 and tube 203 into the fresh charge of compressed air, and the cycle continues.

It is further the case that while this apparatus acts as a charging fuel pump for the respective cylinders and a means of timed ignition for them, it also supercharges each cylinder by a regenerating heat effect which is accumulative and controllable by the relative setting or position of the valve. By means of this kind of a fuel pump and ignition device, a small cylinder motor may be operated on the heavier fuels at the same rotating speed as a gasoline motor, because the necessity of metering each liquid fuel charge is eliminated and no mechanical moving parts have to function at such high frequencies as would be required in the conventional practice. Furthermore, under various load and throttling conditions, these fuel charges are handled and distributed to each cylinder not as a bulk liquid, but as a highly expanded gas vapor, which means that the motor can be idled without missing and the consequent loading up of objectionable oil deposits. Instead of the necessity of using pressure relief valves to each cylinder as is customary with the conventional Diesel engine, any undue high pressures that may result from the accumulation of oil is relieved by the lateral unseating of the whole valve body which is taken care of in the valve adjusting and seating arrangement of the spring loaded dashpot 93 which also normally performs the function of holding the rotating valve 62 against its tapered seat.

The expanding nozzles formed by the shaft ports 64 and cylinder ports 65 are developed in a manner similar to steam turbine expanding nozzles, which materially assists in an efficient radial flow of the inlet charge and directs any detonating wave that may be developed at the point of ignition on the valve surface so that it is finally spent on the cylinder head surface, as indicated by the arrows in Fig. 29, and developes shaft torque.

It is further evidenced and demonstrated by operation that the engine can be operated on the two-cycle principle by replacement of the valve, eliminating the exhaust ports 67 in the valve and turning the valve at twice the speed in the same direction as the cylinders, or by using a similarly ported valve rotated at twice the speed of the cylinders and in the opposite direction.

It will be evident that numerous changes may be made in the details of construction herein described without departing from the scope and spirit of the invention as defined by the appended claims.

The invention claimed is:

1. In a multiple cylinder combustion engine, a rotary valve having ports controlling the cylinders and a valve sleeve containing a passage leading to said ports, a stationary portion containing a fuel supply opening spaced from said valve sleeve, a coupling including a pipe slidable in said fuel supply opening in alignment with the passage in said valve sleeve and a ring having a convex knuckle contact with said pipe and a flat contact against the end of said valve sleeve, and a spring pressing said coupling against said valve sleeve.

2. A combustion engine having a cylinder, a piston therein, driving connections for the piston, a tapered valve for said cylinder having a passage for hot gas, a tapered valve seat having a port cooperating with said valve passage, a thrust mechanism disposed centrally in said valve including a ball bearing and a central thrust rod acting on said ball bearing, and resilient means acting on said thrust rod to hold the valve on its seat.

3. A combustion engine having a cylinder, a piston therein, driving connections for the piston, a tapered valve for said cylinder having a passage for hot gas, a tapered valve seat having a port cooperating with said valve passage, a thrust mechanism disposed centrally in said valve including a ball bearing and a central thrust rod acting on said ball bearing, and a spring-loaded dashpot acting on said thrust rod in a direction to hold the valve on its seat.

4. A combustion engine having a cylinder, a piston therein, driving connections for the piston, a tapered valve for said cylinder having a passage for hot gas, a tapered valve seat having a port cooperating with said valve passage, and a thrust mechanism disposed centrally in said valve including a ball bearing, a cylindrical chamber spaced from said ball bearing in axial alignment therewith, a thrust rod having one end in contact with said ball bearing and the other end in said cylindrical chamber, and spring-actuated means in said cylindrical chamber acting on said thrust rod in a direction to hold the valve on its seat.

5. A combustion engine having a cylinder, a piston therein, driving connections for the piston, a tapered valve for said cylinder having a passage for hot gas, a tapered valve seat having a port cooperating with said valve passage, a spring acting on the outer edge of said valve to hold it on its seat, and a thrust mechanism disposed centrally in said valve including a ball bearing, a cylindrical chamber spaced from said ball bearing in axial alignment therewith, a thrust rod having one end in contact with said ball bearing and the other end in said cylindrical chamber, a plunger in said cylindrical chamber acting on said thrust rod, and a spring-loaded dashpot acting on said plunger in the direction of the valve seat.

6. A multiple cylinder combustion engine comprising a rotor containing a plurality of diverging cylinders, a rotary valve concentric with cylinder movement having an even number of inlet, exhaust and ignition ports with like ports arranged opposite each other on the valve periphery and adapted to control said cylinders successively in predetermined order, and means for driving said valve in timed relation to the rotor.

7. A multiple cylinder combustion engine of the four cycle type comprising a rotor containing five diverging cylinders, a rotary valve having a pair each of inlet, exhaust and ignition ports with like ports arranged opposite each other on the valve periphery and adapted to control said cylinders successively in predetermined order, and means for driving said valve one-quarter revolution faster than said rotor.

8. In a combustion engine a rotor including an odd number of diverging cylinders each having a gas port and combustion space at the inner end, a piston in each cylinder, means for relatively reciprocating the pistons, a rotary valve concentric with cylinder movement having an even number of inlet, exhaust and ignition ports adapted to register with said gas ports successively in predetermined order, and means for driving said valve in timed relation to the rotor.

9. A multiple cylinder combustion engine of the four cycle type comprising a rotor containing five diverging cylinders each having a gas port and combustion space at the inner end, a piston in each cylinder, means for relatively reciprocating the pistons, a rotary valve concentric with cylinder movement having two inlet and exhaust ports grouped in pairs with like ports directly opposite each other on the valve periphery and two ignition ports opposite each other on the valve periphery between said pairs of ports, said ports being adapted to register with said gas ports to control the cylinders successively in predetermined order, and means for driving said valve in the direction of the rotor and one-quarter revolution faster than the rotor.

10. In a multiple cylinder combustion engine, a valve of circular cross-section having exhaust ports arranged opposite each other on the valve periphery, a supplemental valve having additional exhaust ports opposite each other and spaced longitudinally from the valve ports, and an exhaust passage connecting the ports in the valve and supplemental valve.

11. In a multiple cylinder combustion engine, a valve of circular cross-section having two inlet and exhaust ports grouped in pairs with like ports arranged opposite each other on the valve periphery, a supplemental valve having two additional exhaust ports each about equal in width to the space occupied by a pair of valve ports and being in longitudinal alignment with such valve ports, and an exhaust passage connecting the exhaust ports in the valve and supplemental valve.

12. In a multiple cylinder combustion engine, a tapered rotary valve having two inlet and exhaust ports grouped in pairs with like ports arranged opposite each other on the tapered portion of the valve periphery, a tubular extension secured to said valve having two additional exhaust ports each about equal in width to the space occupied by a pair of valve ports and being in longitudinal alignment with such valve ports, and an exhaust passage connecting the exhaust ports in the valve and valve extension.

13. In a multiple cylinder combustion engine, a valve of circular cross-section having a straight cross-fire passage extending therethrough, and a liner of refractory material in said passage having flared end portions engaging the wall of the passage and an intermediate portion spaced from the wall of the passage to provide a dead gas space for heat insulation.

14. In a multiple cylinder combustion engine, a valve of circular cross-section having a tubular cross-fire passage connecting opposite ports in the valve periphery, and a spool-shaped refractory liner inserted in said passage having flared end portions closely fitting the wall of the passage and a reduced intermediate portion spaced from the wall of the passage to provide an annular space for heat insulation.

15. In a multiple cylinder combustion engine, a valve of circular cross-section having a combustion chamber spaced from the valve body, a straight cross-fire passage extending through the valve and connecting said combustion chamber with opposite points on the valve periphery, ported nipples extending through opposite ends of said passage and leading to said combustion chamber, and liners of refractory material in said nipples each having flared end portions engaging the inner wall of the nipple and a narrower intermediate portion spaced from the wall of the nipple to provide a surrounding space for heat insulation.

16. In a multiple cylinder combustion engine, a valve of circular cross-section having a plurality of cross-fire ports about its periphery, a spark plug in said valve, a common combustion chamber connecting said cross-fire ports, and a socket supporting said spark plug having a restricted opening connecting the socket with the combustion chamber to minimize radiation of heat from the combustion chamber to the spark plug.

17. In a multiple cylinder combustion engine, a valve of circular cross-section having a plurality of cross-fire ports about its periphery, a spark plug in said valve, and a member disposed centrally in said valve separated from the body thereof having at one end a socket supporting said spark plug and at the other end a combustion chamber connecting said cross-fire ports and having a restricted opening between said socket and combustion chamber leading to the spark plug and proportioned to minimize radiation of heat from the combustion chamber to the spark plug.

18. In a multiple cylinder combustion engine, a rotary valve having a pair of ignition ports at opposite points on its periphery, separate spark plugs inside the valve having spark gaps adjacent the respective ignition ports, a pair of telescoping sleeves disposed in axial alignment in said valve, individual conductors in one sleeve connected to the respective spark gaps, diametrically opposed distributor segments on the other sleeve having individual conductors in sliding engagement with said first mentioned conductors, and a stationary high tension terminal contact adapted for alternate engagement with said distributor segments.

19. In a multiple cylinder combustion engine, a valve of circular cross-section having a pair of ignition ports on its periphery, separate spark plugs inside the valve having spark gaps adjacent the respective ignition ports, a distributor including a stationary contact brush and a rotatable contact ring having a high tension lead connected to one of said spark plugs, a central thrust rod for said valve in electrical contact with a separate high tension lead to the other spark plug, and an ignition system having a terminal connected to said stationary contact brush and a second terminal connected to said thrust rod.

20. A combustion engine comprising a plurality of cylinders, a valve between said cylinders adjacent their head ends, cross-fire ports on the valve periphery having a connecting passage for firing a succeeding cylinder from a working cylinder, a combustion chamber in said valve including an elongated sealed tube transverse to and connected with said crossfire passage, and means for admitting fuel under high constant pressure to said combustion chamber.

21. A combustion engine comprising a plurality of cylinders, a valve between said cylinders adjacent their head ends, cross-fire ports on the valve periphery having a connecting passage extending transversely through the valve for firing a succeeding cylinder from a working cylinder, a combustion chamber including an elongated sealed tube concentric with the valve axis and connected adjacent one end with said cross-fire passage, and means for admitting fuel under high constant pressure to said combustion chamber.

Signed at New York, in the county of New York and State of New York this 18th day of January A. D. 1930.

WILLIAM HARPER, Jr.